US008211290B2

(12) United States Patent
Suominen

(10) Patent No.: US 8,211,290 B2
(45) Date of Patent: Jul. 3, 2012

(54) METHOD AND APPARATUS FOR REMOVING IMPURITIES FROM WASTE WATER BY ELECTROFLOTATION

(75) Inventor: Hannu L. Suominen, Maple Grove, MN (US)

(73) Assignee: BCDE Group LLC, Minneapolis, MN (US)

( * ) Notice: Subject to any disclaimer, the term of this patent is extended or adjusted under 35 U.S.C. 154(b) by 1036 days.

(21) Appl. No.: 10/540,207

(22) PCT Filed: Jan. 24, 2003

(86) PCT No.: PCT/FI03/00059
§ 371 (c)(1),
(2), (4) Date: Sep. 13, 2006

(87) PCT Pub. No.: WO03/062152
PCT Pub. Date: Jul. 31, 2003

(65) Prior Publication Data
US 2007/0029201 A1 Feb. 8, 2007

(30) Foreign Application Priority Data

Jan. 25, 2002 (FI) ..................................... 20020139
Dec. 18, 2002 (FI) ..................................... 20025064

(51) Int. Cl.
*C02F 1/465* (2006.01)
(52) U.S. Cl. ........ 205/757; 205/742; 204/272; 204/276; 204/284; 210/205; 210/705
(58) Field of Classification Search .................. 204/232, 204/240, 275.1–276, 284, 272; 205/742, 205/755, 757; 422/255, 261; 210/205, 705
See application file for complete search history.

(56) References Cited

U.S. PATENT DOCUMENTS 3,972,800 A * 8/1976 King .............................. 204/671
4,294,697 A 10/1981 Sawa et al.
4,673,494 A 6/1987 Krofta
(Continued)

FOREIGN PATENT DOCUMENTS
CA 2510638 A1 7/2003
(Continued)

OTHER PUBLICATIONS

Till et al. "Fe(0)-supported Autotrophic Denitrification" Environ. Sci. Technol. 1998, 32, 634-639.*
(Continued)

*Primary Examiner* — Kaj K Olsen
*Assistant Examiner* — Susan D Leong
(74) *Attorney, Agent, or Firm* — Joseph R. Kelly; Westman, Champlin & Kelly, P.A.

(57) ABSTRACT

The invention relates to a method and apparatus for removing impurities from waste water by electroflotation. The waste water to be cleaned is conducted through an electrolytic cell. Electrolysis is performed between two electrodes (1, 2) of different electronegativities, such that the more electronegative electrode (1), which is non-wearing in a cleaning process, is used for producing hydrogen gas and hydroxyl ions from water. The less electronegative electrode (2), which is an active, wearing electrode in a cleaning process, is used for producing metal ions in a solution to be cleaned. In addition to this basic reaction, a desired oxidation-reduction reaction is initiated in the cell in a strictly controlled electric field for removing one or more designated impurities from cleaned water.

24 Claims, 2 Drawing Sheets

U.S. PATENT DOCUMENTS

Figure 1:
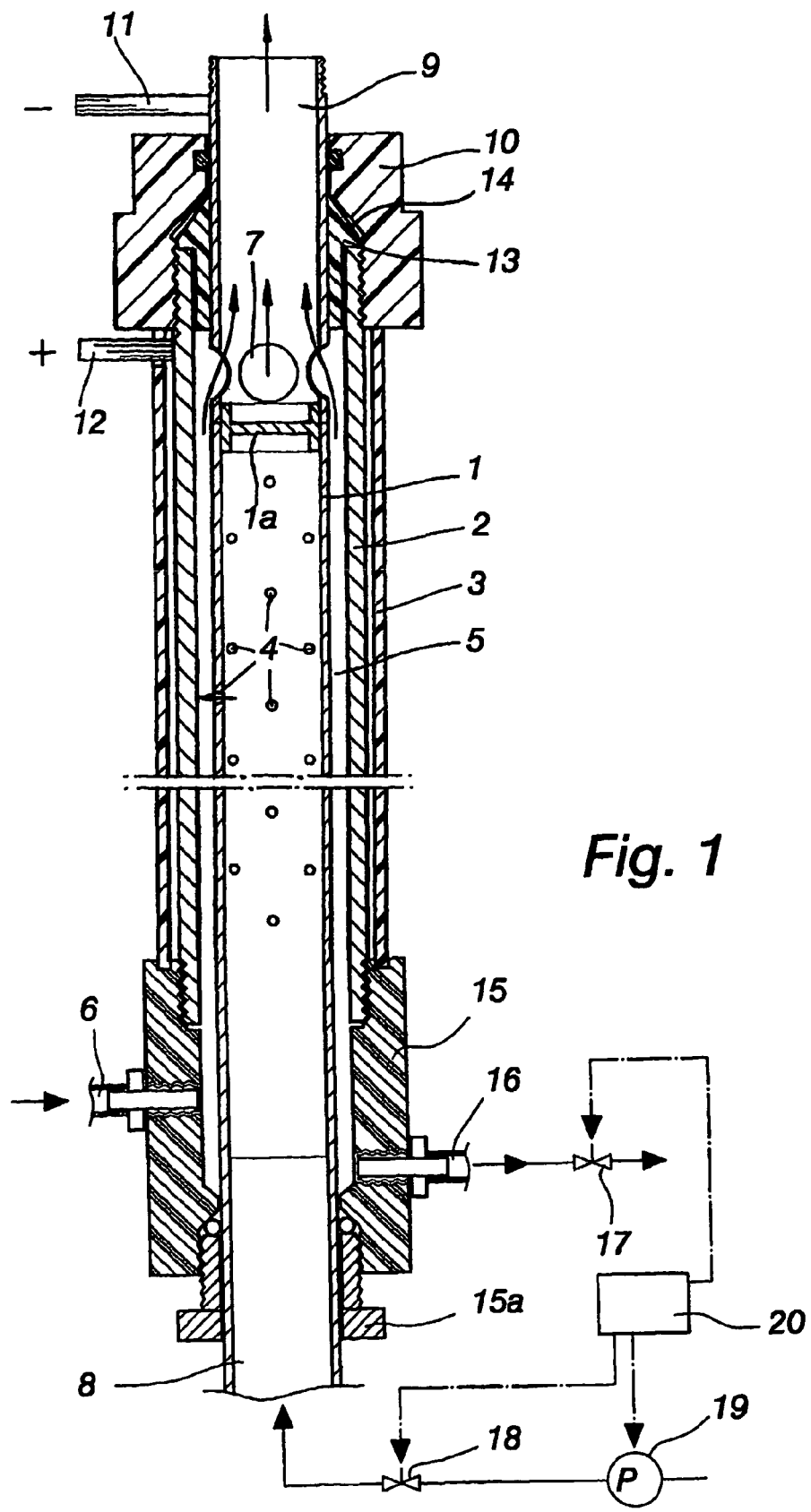

| | | | |
|---|---|---|---|
| 4,872,959 A * | 10/1989 | Herbst et al. | 205/566 |
| 5,022,974 A * | 6/1991 | Haivala | 204/278.5 |
| 5,888,359 A * | 3/1999 | Suominen | 204/232 |
| 6,066,732 A | 5/2000 | Taylor et al. | |
| 6,086,732 A | 7/2000 | Suominen | |
| 6,244,198 B1 | 6/2001 | Suominen | |
| 6,651,818 B1 | 11/2003 | Iimasti et al. | |
| 6,909,025 B2 | 6/2005 | Suominen | |
| 7,160,713 B2 | 1/2007 | Suominen | |
| 7,914,684 B2 | 3/2011 | Suominen | |
| 2007/0029201 A1 | 2/2007 | Suominen | |

FOREIGN PATENT DOCUMENTS

| | | | |
|---|---|---|---|
| EP | 0 659 692 | A1 | 6/1995 |
| EP | 1 203 753 | A1 | 5/2002 |
| FI | 20025064 | A | 7/2003 |
| FI | 115904 | B | 8/2005 |
| JP | 4298284 | A | 10/1992 |
| JP | 6-328081 | A | 11/1994 |
| JP | 7051677 | A | 2/1995 |
| JP | 8-132051 | A | 5/1996 |
| JP | 10-258287 | A | 9/1998 |
| JP | 11267683 | A | 10/1999 |
| WO | 8906161 | A1 | 7/1989 |
| WO | WO-94/14709 | A1 | 7/1994 |
| WO | 9615989 | A1 | 5/1996 |
| WO | WO-01/16032 | A1 | 3/2001 |
| WO | WO-01/17911 | A1 | 3/2001 |

OTHER PUBLICATIONS

"Onshore Testing of Produced Water by Electroflocculation" Rubach et al., *Filtration & Separation*, Oct. 1997, pp. 887-882.

* cited by examiner

METHOD AND APPARATUS FOR REMOVING IMPURITIES FROM WASTE WATER BY ELECTROFLOTATION

The invention relates to a method for removing impurities from waste water by electroflotation, in which method the waste water to be cleaned is passed through an asymmetrical electrolytic cell, resulting in a cell reaction which produces both metal hydroxide and hydrogen gas. If the active electrode is made of iron or aluminium, the cell reaction produces iron or aluminium hydroxide, respectively.

The invention relates also to an apparatus for removing impurities from waste water by electroflotation.

The term electroflotation is based on the fact that the gas evolving in electrolytic cells raises also metal hydroxide (typically iron or aluminium hydroxide) produced in the cells, and impurities filtered thereby from water, to the surface of clean water, enabling the mechanical removal of flock therefrom. This separation of flock and water is already initiated in an electrolytic cell and can be completed in a flock extraction tower, such as those described in the Applicant's patent publications U.S. Pat. No. 5,888,359 and U.S. Pat. No. 6,086,732, or in conventional secondary settling tanks used in sewage treatment plants.

A problem in sewage treatment has been the lack of means for a sufficient removal of harmful impurities, such as nitrogen, and toxic compounds, such as chlorophenols and polyaromatic hydrocarbons.

The invention relates to a method and apparatus, capable of removing impurities from waste waters more effectively than before and economically.

This object is achieved in the invention by means of a method as set forth in the appended claim 1 and an apparatus as set forth in claim 6. The dependent claims disclose preferred embodiments or applications for the method and apparatus.

For example, nitrogen can be removed from low-salt waste waters by means of electroflotation as described herein always to more than 80%, typically to more than 95%, and from almost salt-free waste waters to more than even 99%, without chemical additives.

On the other hand, seep waters in landfill sites can be cleared of toxic organic compounds, while reducing the salt content thereof, as well.

Figure 2:
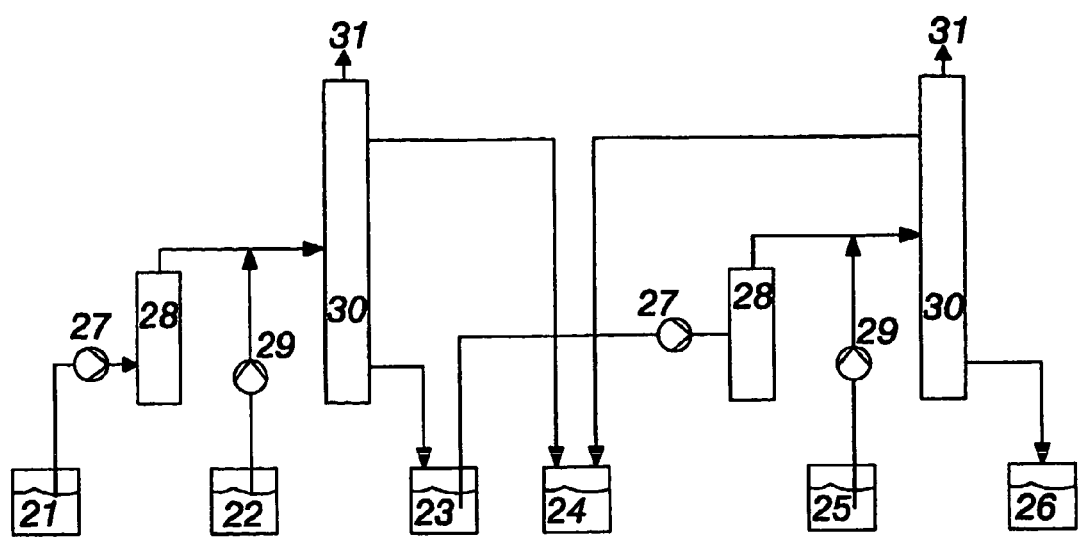

The invention will now be described by way of an exemplary embodiment with reference to the accompanying drawings, in which FIG. 1 shows one preferred exemplary embodiment for an electrolytic cell practicable in a method and apparatus of the invention; and FIG. 2 shows schematically an entire cleaning plant according to one test system.

The electrodes of an electrolytic cell according to the invention (FIG. 1) are comprised of pipes. An inner electrode pipe 1 is made of stainless steel and provided with holes 4 for directing washing sprays to the surface of an outer electrode pipe 2 of undoped metal. The metal used for the outer electrode pipe comprises typically iron or aluminum. The cylindrical electrode pipes 1 and 2 are set coaxially and define therebetween a cylindrical and non-interrupted electrolysis space 5, wherein the waste water is supplied from a duct 6. The negative pole of a power source is connected to the inner electrode pipe 1 by way of a terminal 11 and the positive pole to the iron or aluminum electrode pipe 2 by way of a terminal 12. The inner electrode 1 is made of steel or some other metal more electronegative than iron or aluminum. Thus, the inner pipe 1 is non-wearing (releasing only electrons) and the iron-made outer pipe 2 is prone to wearing as it releases iron ions. This is why the outer pipe 2 is made readily replaceable as will be described hereinafter.

The inner electrode pipe 1 is divided by a partition 1a for two separate tubular spaces 8 and 9. The tubular space 8 covers essentially the length of the electrolysis space 5 and is provided with washing spray holes 4. The tubular space 9 is connected by way of quite large holes 7 with the downstream end of the electrolysis space 5, the water and resulting flock being able to flow from the electrolysis space 5 into the pipe section 9. The ends of the pipe sections 8 and 9 are fitted with inlet and outlet tubes of an insulating material, such as plastics. The pipe section 8 is supplied with washing water at a pressure sufficient for delivering appropriately powerful washing sprays from the holes 4. The electrodes' surface can also be cleaned by conducting a pulse of alternating current to the electrodes.

The iron or aluminium pipe 2 terminates prior to the sewage inlet point 6 and the inner pipe 1 continues past the inlet point 6 by way of a valve 18 to a wash water pump. The valve 18 has its opening action and a wash water pump 19 has its actuation controlled by a control device 20 to proceed intermittently. Over each wash cycle, a valve 17 for an outlet duct 16 coupled with the bottom end of the electrolysis space 5 is adapted to be opened for discharging precipitate and wash water from the electrolysis space 5.

The outer electrode 2 is further encircled by a housing tube 3 of an insulating material, such as plastics.

The electrolytic cell is held together by end caps 10 and 15. In the illustrated case, the pipe 2 has its ends provided with male threads engaged by threads of the end caps 10 and 15. Upon tightening the end cap 10, a packing 13 is pressed by conical surfaces 14 against the outer surface of the inner pipe 1. In so doing, the packing 13 also compresses against the end surface of the outer pipe 2. The electrolysis space 5 has its bottom end sealed with a packing which is pressed against an inner shoulder of the bushing 15 by means of a plug 15a. The end caps 10 and 15 retain the pipes 1 and 2 concentrical relative to each other. Of course, the electrode pipes can be provided with end assemblies other than what is described above.

The pipes 1 and 2 can be supplied in diameters and lengths varying according to a particular application. As the size of a processing plant becomes larger and flows increase, a sufficient number of cells will be connected in parallel.

Using the concentrically nested electrode pipes 1 and 2, as well as the flushing spray holes 4 in the inner pipe 1, provides a simple way of maintaining a clean electrode surface. By virtue of the unscrewable end caps 10 and 15, the wearing iron or aluminium electrode pipe 2 is readily replaceable.

The following discloses foundations, which constitute the basis for a method of the invention for denitrification by electroflotation. The active electrode 2 is made of iron.

1. Cell Reactions 1.1. $H_2O \Leftrightarrow H^+ + OH^-$
1.2. $Fe \Leftrightarrow Fe^{+3} + 3e^-$
1.3. $Fe^{+3} + 3OH^- \Leftrightarrow Fe(OH)_3 \downarrow$ (iron hydroxide)
1.4. $2H^+ 2e^- \Leftrightarrow H_2 \uparrow$ (hydrogen gas)

The electrolysis produces a mildly alkaline solution, since $H^+$ ions escape as hydrogen gas from the solution more quickly than $OH^-$ ions.

2. Removal of Nitrogen
A. Ammonium ($NH_4^+$) Nitrogen:
2.1. $NH_3 + H_2O \Leftrightarrow NH_4^+ + OH^-$
2.2. $NH_3 + OH^- + H^+ \Leftrightarrow NH_4^+ + OH^-$
2.3. $NH_3 + H^+ \Leftrightarrow NH_4^+$ (ammonium ion)

In electrolysis, the $H^+$ ion bonds with an ammonia molecule and forms an ammonium ($NH_4^+$) ion. It does not evaporate, but dissolves in water. When the aqueous solution contains e.g. an $SO_4^{2-}$ ion, the electrolysis serves to remove an $NH_4^+$ ion and nitrogenous organic substances which coprecipitate with iron hydroxide. The precipitate rises along with $H_2$ gas as a flock to the surface of clean water. Prior to its passage into a electrolytic cell, the waste water could have been supplied in a conventional manner e.g. with an appropriate amount of acidic ferrous sulphate.

2.4. $Fe(OH)_3 + SO_4^{2-} + 2NH_4^{-+} + R \Leftrightarrow R\text{—}Fe(OH)_3\downarrow + (NH_4)_2SO_4$ In electrolysis, the $NH_4^+$ nitrogen present in waste water and organic nitrogenous compounds (R) coprecipitate into iron hydroxide precipitate $Fe(OH)_3\downarrow$ or the $NH_4^+$ nitrogen may also be reduced while iron oxidizes to iron oxide.

2.5. $Fe + NH_4^+ + OH^- \Leftrightarrow FeO + 2\frac{1}{2}H_2\uparrow + \frac{1}{2}N_2\uparrow$ 2.6. $2NH_4^+ + 2e^- \Leftrightarrow N_2\uparrow + 4H_2\uparrow$ 2.7. $Fe \Leftrightarrow Fe^2 + 2e^-$ The $H_2$ gas (hydrogen gas), evolved simultaneously in the cell, raises the precipitate as a flock to the surface of clean water in a flock extraction tower and/or in a secondary settling tank. Thus, nitrogen is removed in a solid form. (Operation of a flock extraction tower is described in patent publications U.S. Pat. No. 5,888,359 and U.S. Pat. No. 6,086,732).

$NH_4^+$ nitrogen develops in sewage waters principally from urea as follows:

2.8.

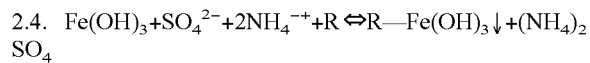

2.9. $NH_3 + H_2O \Leftrightarrow NH_4^+ + OH^-$

B. Nitrate ($NO_3^-$) Nitrogen:

Ammonia is oxidized by microbes to nitrate (nitrification) or to aminonitrogen, which bonds primarily inside microbe cells in a biochemical reaction promoted by enzymes (enz.).

2.10.

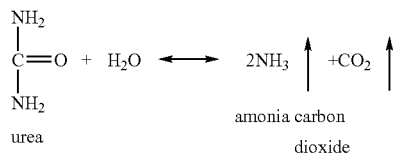

This is a sum reaction. The intracellular reaction is enzymatically catalyzed and much more complicated.

2.11.

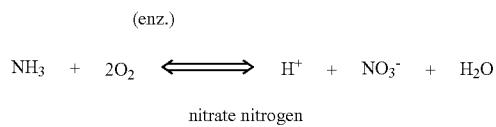

In electrolysis, iron is oxidized in cells (always) and nitrogen ($NO_3^-$) is reduced as follows:

2.12. $6Fe + 2H^+ + 2NO_3^- \Leftrightarrow 6FeO\downarrow + H_2\uparrow + N_2\uparrow$ 2.13. $2Fe + H^+ + NO_3^- \Leftrightarrow Fe_2O_3\downarrow + \frac{1}{2}H_2\uparrow + \frac{1}{2}N_2$ =>NITROGEN ESCAPES FROM WASTE WATER AS NITROGEN GAS ($N_2$) (denitrification)

Microbe cells also establish denitrification in anaerobic conditions (without oxygen), in which the $NO_3^-$ ion functions as an oxidant instead of the $O_2$ molecule.

Denitrification carried out by electrolysis in cells is nearly quantitative and really quick as compared to a slow and more expensive removal of nitrogen effected by means of microbes.

Biological denitrification as a nitrogen elimination method provides a nitrogen reduction of about 63% with comparatively expensive technology.

Electrolysis has always provided a nitrogen reduction of more than 80%, and at best, e.g. in the treatment of cow dung, a nitrogen reduction of more than 99%, such that the nitrogen content of cleaned water is less than 2 mg/l.

The oxidation of iron to a ferric or ferrous ion and the reduction of nitrogen take place in a cell at a certain point of resonance energy, In other words, the electrical energy introduced into a cell must be dimensioned according to the dimensioning and flow of the cell, i.e. the retention time of waste water in the cell space. The search for a proper point in resonance energy must be conducted experimentally and then the cell flow is controlled by automation with respect to the flow of waste water. The flow-through of waste water need not be intercepted for a washing period, since the washing is executed at a substantially higher pressure and with a smaller liquid volume than the pressure and liquid volume of through-flowing waste water.

3. Treatment of Landfill Seepage

An apparatus as shown in FIG. 2 was used for conducting a series of tests in relation to the applicability of the apparatus for the cleaning of landfill seep water.

The following describes first a test apparatus, then a test procedure, and finally test results.

3.1 Test Apparatus

A two-stage apparatus in the sense that two electrolytic cells 28 provided with aluminium electrodes (or two iron electrodes or one iron and one aluminium electrode) are successively in cascade connection. One test was conducted in a single stage and the other test in a double stage. From a tank 21 seepage is pumped with a pump 27 through an electrolytic cell 28. From a tank 22 a polymer solution is fed by a pump 29 into a mass flow discharging from the cell 28, which is conveyed to a flock and purified water separation tower 30, the top end of which comprises a measurement 31 for outgoing gases (HCl, $Cl_2$). From the bottom end of the tower 30 purified water is conducted into a tank 23 and from the top end of the tower 30 flock is conducted into a tank 24. In the second stage, purified water is delivered from the tank 23 by means of a pump 27 through a second electrolytic cell 28 to a second flock and purified water separation tower 30. Also, in the second stage, a mass flow between the cell 28 and the tower 30 is supplied with a polymer solution by a pump 29 from a tank 25. The twice-treated water is conducted from the bottom end of the tower 30 into a tank 26 and the flock is conducted also from the top end of the second tower 30 into the tank 24.

3.2 Test Procedure (Test Runs)

10 separate test runs were conducted, some in a single stage with both Fe- and Al-cells. Some of the two-stage test runs were conducted by using two different cell types, namely an Fe-cell (active electrode of iron) and an Al-cell (active electrode of aluminium).

The following describes two interesting and representative test runs.

Test Run 1

Test involved a two-stage purification treatment. The first stage involved the use of an Al-cell and the second stage an Fe-cell. The first stage involved feeding undiluted seep water through the Al-cell at a rate of about 120 l/h. Polymer solution was fed from the tank 22 by the pump 29 at a rate of 10-12 l/h. Power was supplied to the cell over the current range of 10-50 A and the voltage range of 3-7 V. The entire power range was subjected to scanning, and the finding was that the clarification and decoloration of solution were directly proportional to electric power. At a power of more than 1 kWh/m$^3$, the formation of flock no longer improved. Gas analysis was conducted at an electric power which corresponds to about 1.0 kWh/m$^3$ of undiluted seepage. Formation of chlorine gas was not observed. The second stage involved delivering the clean water fraction of the first stage through an Fe-cell at a feed rate of 60-120 l/h. Polymer solution was fed at a rate of 10 l/h. Scanning was conducted across the entire power range at a current of 10-30 A and a voltage of 3-7 V.

Test Run 2

The undiluted seep water was run twice through an Al-cell. Feed rate was 60-150 l/h of waste water and 10-15 l/h of polymer solution. Average power supply for the cell was 30 A, 3 V. Quick scanning was also conducted to a maximum power of 52 A, 7 V. Gas formation was powerful and flock climbed very quickly in the flock separation tube 30, in which the separation surface of flock remained easily stationary (could be monitored through the clear tube). Water coming from the tower 30 clarified at settings as low as 30 A/3 V/120 l/h, i.e. at a power of 0.75 kWh/m$^3$. Increasing power beyond 1 kWh/m$^3$ provided no improvement. Formation of chlorine gas was not observed.

3.3 Analytical Data from Test Runs

Samples picked up from clean water fractions and flock fractions were analyzed in different laboratories by standard methods. Samples were analyzed for more than 80 chemical parameters, only the most important of which will now be dealt with in a summarized manner.

The seep water to be cleaned had a yellow-brownish and somewhat cloudy appearance. Judging from odour, it contained ammonium and sulphur compounds. Both tests confirmed that seep water clarifies and becomes almost colourless and odourless. The first test's firs stage was intentionally conducted to produce only partially purified water by optimizing the process just right only in terms of flock formation, using electric power as little as possible. The second test's first stage was conducted by imitating the first test's first stage. The second test's second stage was conducted with intention to set a balance for a final result as clean as possible.

Both tests showed a substantial reduction in electrical conductance. In the second test, a reduction in conductance was about 30%. Conductance in flock is substantially higher than in cleaned water, i.e. flock has conductance promoting compounds concentrated therein. Ph remained approximately unchanged.

Nitrogen reduction remained at a level lower than in the process of cleaning other lower-salt waste waters. The tests indicated that the removal rate of nitrogen was substantially consistent with the reduction of salt content.

Phosphorus was eliminated in cleaning almost completely, even at high concentrations.

Formation of chlorine or hydrogen chloride was not observed in test conditions, although the seep water to be cleaned was in fact a saline solution. On the other hand, the reduction of chloride by about 29%, and its concentration in flock, suggests that there could be some compound bonding a chloride ion to flock. The conclusion is that chloride must have bonded to flock, e.g. by way of substitution reactions to organic molecules, or in the form of a salt to flock-forming, very high-density ferric hydroxide precipitate which functions as a molecular sieve.

Salt Content and Removal of Ammonium Nitrogen

Calculations based on concentrations of chloride and sodium ions resulted in a salt content of about 3.6%. In single-stage cleaning the salt content fell to about 2.9%, i.e. the reduction was about 19% (at a power of 1 kWh/m$^3$).

In two-stage cleaning the salt content fell to about 2.4%, i.e. the reduction was about 33% (at a power of 1.75-2 kWh/m$^3$).

Within the margin of error, these results provided a conclusion that the removal of salt is almost linear with respect to applied power.

The Fe-cell was able to eliminate 47% of salt, i.e. the salt content fell to the level of 1.92%, at a power of 3 kWh/m$^3$.

The results provided a conclusion that about 3 kWh/m$^3$ would be sufficient to remove about 50% of salt (to salt content of 1.8%) and about 6 kWh/m$^3$ would be enough to eliminate salt completely from seep water.

In light of the above, the method and apparatus are highly suitable for cleaning generally salt-containing waste water, such as contaminated sea water.

In this conjecture, it should be noted that the removal of ammonium nitrogen from clarified water is proportional to the variation of salt content in seep water or other such waste water in the described test conditions.

The reductions of ammonium nitrogen and salt seem to correlate perfectly, it being also confirmed experimentally that ammonium nitrogen can be removed from waste water by 99% (to 10 mg/l from 1100 mg/l), as the waste water has a salt content of less than 0.8%.

Heavy metals were removed from seep water to flock so efficiently that no presence thereof was observed in cleaned water.

Phenols and Chlorophenols

The reduction of phenols was over 90%. About 80% of phenols had dispersed in electroflotation and a small amount with respect to cleaned water had concentrated in flock.

Chlorophenols were removed by 100% from cleaned water. Chlorophenols have dispersed in a cleaning process by about 90%. Only 10% of their original amount in salt water was found in flock. The most interesting observation is pentachlorophenol, which had disappeared completely in a cleaning process. The observation is consistent with previous test results. The likely reason is the scission of a benzene ring.

Polyaromatic Hydrocarbons (PAH)

No PAH compounds were found in cleaned water. Reduction is 100%. Of all PAH compounds, over 94% had dispersed during a cleaning process.

Summary of Test Results

On the basis of test results, seep water is most preferably cleaned with an apparatus, comprising a cascade made up by an Al-cell and an Fe-cell. Cleaning can also be managed with an Fe-cell alone, provided that seep water does not contain large amounts of sulphides. Cleaning can be done with an Al-cell alone, but the cleaning cost will be considerably higher than with an Fe-cell.

Due to fluctuations regarding the salt water composition, it is advisable to link the cells in such a way that cleaning can be effected either by just one type of cell or by a combination of two cell types.

According to measurements, the lowest practical electric power is about 3 kWh/m³ seep water and the maximum electric power for a cleanest result is not higher than 6 kWh/m³ seep water.

A preferred choice for the non-wearing electrode is steel as the amounts of its alloy metals can be used to regulate how much the electronegativity increases with respect to iron. Aluminium has a lower electronegativity than iron.

Thus, the selection of metals for active electrodes can be used to influence a electronegativity difference. It is sufficient that the electrodes be coated with metals whose electronegativity difference is appropriate for a material to be eliminated for accomplishing its removal based on a redox or oxidation-reduction reaction.

The invention claimed is:

1. A method for removing impurities from waste water by electroflotation, the method comprising the steps of:
    passing the waste water to be cleaned through an electrolytic cell (28) provided with two metal electrodes (1,2) of different electronegativities;
    performing electrolysis between the two electrodes (1,2), such that the more electronegative electrode (1), which is non-wearing in a cleaning process, is used for producing hydrogen gas and hydroxyl ions from water, and that the less electronegative electrode (2), which is an active, wearing electrode in a cleaning process, is used for producing metal ions in a solution to be cleaned, the method further comprising a combination of following steps:
    automatically controlling the cell current to obtain a controlled electric field in the cell;
    effecting in the cell in the controlled electric field a desired oxidation reduction reaction for removing one or more designated impurities from water to be cleaned;
    feeding the mass flow from the cell to a separation tower (30) that separates a floc and purified water and allowing the hydrogen gas to raise the floc in the separation tower (20);
    using coaxial pipes as electrodes, the coaxial pipes defining an uninterrupted, generally cylindrical electrolysis space in the cell through which the hydrogen gas raises the floc along a generally linear path that is not interrupted by structural elements that cause mixing in the cell so the hydrogen gas raises the floc through the electrolysis space without mixing the floc with the purified water so as to allow the formation of the floc, the inner electrode pipe being the more electronegative electrode (1), having holes; and
    feeding flush water intermittently, during wash cycles, through the inner electrode pipe by pressure for producing flush water sprays through the holes against inner surface of the outer electrode pipe.

2. A method as set forth in claim 1 for removing nitrogen from waste water, characterized in that:
    (a) in electrolysis, hydrogen ions (H.sup.+) are used for producing from ammonia (NH.sub.3) ammonium ions (NH.sub.4.sup.+), which escape upon joining negative ions and upon coprecipitating with iron hydroxide precipitate;
    (b) the precipitate is allowed to rise along with hydrogen gas in the form of floc to the surface of clean water in the floc separation tower (30); and
    (c) in electrolysis, iron is oxidized and NH.sub.4.sup.+ nitrogen and/or nitrate nitrogen (NO.sub.3) is reduced as follows:

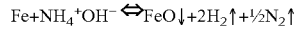

and/or

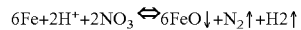

whereby the result is denitrification as nitrogen escapes from waste water in the form of nitrogen gas.

3. A method according to claim 1, where the waste water is landfill seepage or some other salt-containing waste water.

4. A method according to claim 3, characterized in that the seepage or other salt-containing waste water to be cleaned is conducted in a first stage through a first electrolytic cell, and in a second stage the water partially cleaned in the first stage of conducted through a second electrolytic cell.

5. A method as set forth in claim 1, characterized in that the less electronegative electrode is made of iron or aluminum.

6. An apparatus for removing impurities from waste water by electroflotation, said apparatus comprising a set of electrolytic cells, each cell thereof being provided with one or more metal electrodes (2) coupled with a positive pole of a power source and one or more metal electrodes (1) coupled with a negative pole of the power source, and an electrolysis space (5) between the electrodes, the electrode (1) connected to the negative pole of a power source being made at least in its surface layer from a more electronegative material than the electrode (2) connected to the positive pole, the more electronegative electrode (1) being non-wearing in a cleaning process and releasing only electrons received thereby into a solution to be cleaned, and the less electronegative electrode being an active, wearing electrode in a cleaning process and releasing metal ions into a solution to be cleaned, the electrodes (1, 2) having such an electronegativity difference that a desired oxidation-reduction reaction is achieved;
    a control device controlling a cell current, thereby enabling a desired oxidation-reduction reaction in the cell;
    a separation tower (30) separating a floc and purified water, allowing hydrogen gas to raise the floc in the separation tower (30);
    a pump (27) for pumping a mass flow through the cell (28), as a closed continuous flow, to the separation tower (30);
    coaxial pipes as the electrodes (1, 2), the inner electrode pipe being the more electronegative electrode (1) and having holes (4), the coaxial pipes defining an uninterrupted cylindrical electrolysis space, uninterrupted by structural elements that cause mixing of the floc and purified water as the hydrogen gas raises the floc in the separation tower; and
    flushing means (16-20) for feeding flush water intermittently, during wash cycles, through only the inner electrode pipe by pressure for producing flush water sprays through the holes (4) against inner surface of the outer electrode pipe (2), the flushing means feeding the flush water, during the wash cycles, at a pressure higher than a pressure at which the pump (27) introduces the mass flow to the separation tower.

7. An apparatus as set forth in claim 6, characterized in that the less electronegative electrode is made of iron or aluminum, the iron or aluminum pipe (2) being the outermost and readily replaceable.

8. An apparatus as set forth in claim 7, characterized in that the outer electrode pipe (2) terminates prior to a waste water inlet (6), while the inner pipe (1) continues past the waste water inlet (6) by way of a valve (18) to a wash water pump (19).

9. An apparatus as set forth in claim 8, characterized in that the valve (18) has its opening and the wash water pump (19) has its actuation controlled to proceed intermittently, while a valve (17) in an outlet duct (16) connected to the bottom end of the electrolysis space (5) is adapted to be opened for discharging precipitate and wash water from the electrolysis space (5).

10. An apparatus as set forth in claim 7, characterized in that the inner electrode pipe (1) is made of stainless steel and the iron- or aluminum-made outer electrode pipe (2) is covered with an insulating housing tube (3).

11. An apparatus as set forth in claim 7, characterized in that the electrode pipes (1, 2) are locked concentrically to each other by means of unscrewable end caps (10, 15), which surround the ends of the inner electrode pipe (1) and inside which are retained the ends of the outer electrode pipe (2).

12. A method as set forth in claim 2, characterized in that the less electronegative electrode is made of iron or aluminum.

13. A method as set forth in claim 3, characterized in that the less electronegative electrode is made of iron or aluminum.

14. A method as set forth in claim 4, characterized in that the less electronegative electrode is made of iron or aluminum.

15. An apparatus as set forth in claim 8, characterized in that the inner electrode pipe (1) is made of stainless steel and the iron- or aluminum-made outer electrode pipe (2) is covered with an insulating housing tube (3).

16. An apparatus as set forth in claim 9, characterized in that the inner electrode pipe (1) is made of stainless steel and the iron- or aluminum-made outer electrode pipe (2) is covered with an insulating housing tube (3).

17. An apparatus as set forth in claim 8, characterized in that the electrode pipes (1, 2) are locked concentrically to each other by means of unscrewable end caps (10, 15), which surround the ends of the inner electrode pipe (1) and inside which are retained the ends of the outer electrode pipe (2).

18. An apparatus as set forth in claim 9, characterized in that the electrode pipes (1, 2) are locked concentrically to each other by means of unscrewable end caps (10, 15), which surround the ends of the inner electrode pipe (1) and inside which are retained the ends of the outer electrode pipe (2).

19. An apparatus as set forth in claim 10, characterized in that the electrode pipes (1, 2) are locked concentrically to each other by means of unscrewable end caps (10, 15), which surround the ends of the inner electrode pipe (1) and inside which are retained the ends of the outer electrode pipe (2).

20. An apparatus as set forth in claim 15, characterized in that the electrode pipes (1, 2) are locked concentrically to each other by means of unscrewable end caps (10, 15), which surround the ends of the inner electrode pipe (1) and inside which are retained the ends of the outer electrode pipe (2).

21. A method according to claim 3, wherein the salt-containing waste water is contaminated sea water.

22. A method for removing impurities from waste water by electroflotation, the method comprising the steps of:
passing the waste water to be cleaned through an electrolytic cell (28) provided with two metal electrodes (1,2) of different electronegativities;
performing electrolysis between the two electrodes (1,2), such that the more electronegative electrode (1), which is non-wearing in a cleaning process, is used for producing gas and ions from water, and that the less electronegative electrode (2), which is an active, wearing electrode in a cleaning process, is used for producing metal ions in a solution to be cleaned, the method further comprising a combination of following steps:
automatically controlling the cell current to obtain a controlled electric field in the cell;
effecting in the cell in the controlled electric field a desired oxidation reduction reaction for removing one or more designated impurities from water to be cleaned;
feeding the mass flow from the cell to a separation tower (30) that separates a floc and purified water and allowing the gas to assist in raising the floc
using coaxial pipes as the two electrodes, the coaxial pipes defining, uninterrupted by structural elements that cause mixing of the floc and purified water, an uninterrupted, generally cylindrical electrolysis space through which the gas raises the floc in the cell along a generally linear path, the inner electrode pipe being the more electronegative electrode (1); and
intermittently cleaning the coaxial pipes by injecting flush water during wash cycles, the wash cycles being intermittent to permit formation of the floc and to permit the gas to raise the floc in the cell.

23. The method of claim 22 wherein there are only two electrodes and wherein the less electronegative electrode comprises iron.

24. The method of claim 22 wherein there are only two electrodes and wherein the less electronegative electrode comprises aluminum.

* * * * *